United States Patent [19]

Sudberry

[11] 3,799,571

[45] Mar. 26, 1974

[54] OVERLOAD SPRING

[76] Inventor: Ellis P. Sudberry, 11038 Holmes Ave., Mira Loma, Calif. 91752

[22] Filed: June 23, 1972

[21] Appl. No.: 265,860

[52] U.S. Cl.................. 280/124 R, 267/30, 267/45
[51] Int. Cl............................................ B60g 11/38
[58] Field of Search............. 280/124 R; 267/42, 44, 267/45, 46, 30, 21 R, 19 R

[56] References Cited
UNITED STATES PATENTS

| | | | |
|---|---|---|---|
| 2,058,281 | 10/1936 | Wesley | 267/45 |
| 1,381,255 | 6/1921 | Tisman | 267/45 |
| 2,973,952 | 3/1961 | Heintzelman | 267/30 |
| 2,826,407 | 3/1958 | Scheublein, Jr. et al. | 267/45 |

Primary Examiner—Philip Goodman
Assistant Examiner—John A. Carroll
Attorney, Agent, or Firm—Dominick Nardelli

[57] ABSTRACT

An overload spring, in the form of a leaf spring is described, which is used in combination with a multi-leaf semi-elliptical spring designed to carry the axle's load above the spring. The overload spring is also substantially semi-elliptical with a bight formed midway between the ends to allow the elliptical portion to coextend with the main leaf of the multi-leaf spring and to allow the bight to extend over the axle. Means are provided on the axle to prevent the bight from closing as the leaves bend and flex.

7 Claims, 3 Drawing Figures

PATENTED MAR 26 1974 3,799,571

OVERLOAD SPRING

FIELD OF THE INVENTION

This invention relates to leaf springs for vehicles and more particularly to springs with means for allowing said vehicles to carry overloads.

BACKGROUND OF THE INVENTION

The prior art suggests many ways to provide means that allow leaf springs on road vehicles to carry overloads, the most common is to add extra leaves to the assembly of leaves. This provides more stiffness, or increases the springs' constant, and under heavy loads the road clearance, i.e., the distance between a chassis and a road, becomes relatively small, causing the chassis to drag over rough roads. Other means, that allow one to overload a vehicle conveniently and economically, have substantially the same drawbacks. To increase road clearance, up to now, one would rely on incorporating a coil spring or an air cushion in combination with the multi-leaf spring. The cost of this is many times that of providing extra leaves.

OBJECT OF THE INVENTION

An object is to provide an efficient and economical overload means that is convenient to install onto a multi-leaf semi-elliptical spring.

Another object is to provide a novel leaf spring that can be installed onto a multi-leaf spring to provide overload features as well as increase road clearance.

These and other objects and features of advantage will become more apparent after studying the following description of the preferred embodiment of the invention, together with the appended drawing.

DETAILED DESCRIPTION OF THE DRAWINGS

Figure 1:
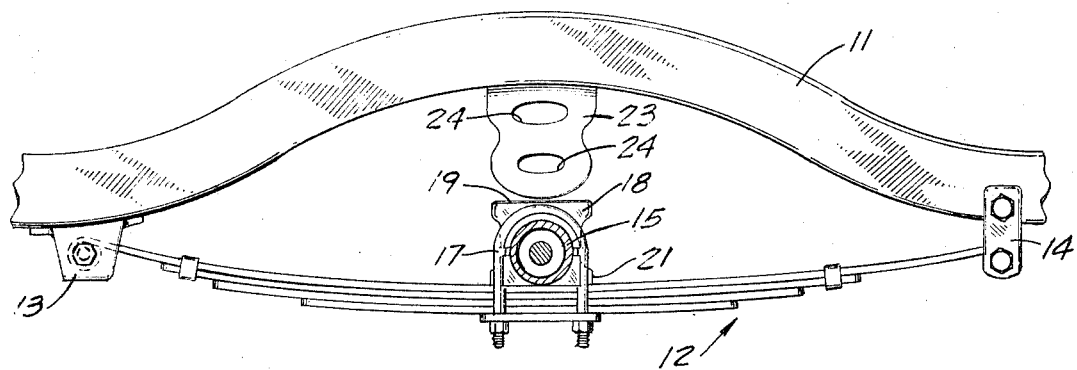
FIG. 1 is a fragmentary sectional view showing a typical standard leaf spring and axle mount for a vehicle.

FIG. 1 shows a fragmentary view of a typical spring and axle mount as employed on a road vehicle; for example, a light-weight pickup truck having a wheel base in the order of 100 inches; the vehicle has two longitudinal box beams of which the rear fragment of one beam 11 is shown. The beam 11 has attached thereto a multi-leaf spring 12, of standard design, by a fixed shackle 13 at one end, and a swinging shackle 14 at the other. Shackles 13 and 14 are standard in the art. Spring 12 is attached to the rear axle housing 15 on the vehicle by a pair of U-bolts 17, of which one is shown. Between the U-bolts 17 and the housing 15 is disposed a bumper 18, having a substantially flat upper surface 19 disposed as shown, and which is maintained substantially horizontal by a pad 21 disposed between the housing 15 and spring 12. The pad 21 and bumper 18 are made separately so that they can be installed around and removed from the housing, as shown, to allow a rubber shock absorber 23 to bump against the surface 19 of bumper 18. The shock absorber is suitably mounted to the beam 11 as shown. The shock absorber 23 is of a standard design, and is made into a figure eight with two holes 24. Under normal loading of the vehicle, the shock absorber 23 is slightly spaced from the bumper 18 so that any slight overload causes the two to make contact as well as when the vehicle bounces along the road. Thus, one can see that adding additional leaves to spring 12 would only make it stiffer, which is undesirable and contrary for a more comfortable ride. If one, instead of adding leaves to the spring, would replace the spring with another so that the vehicle would have more clearance and still have the same spring constant to provide a more comfortable ride, the spacing between the shock absorber 23 and the bumper 18 would be large and that when contact is made between the two, a jolt will be felt in the vehicle.

Figure 2:
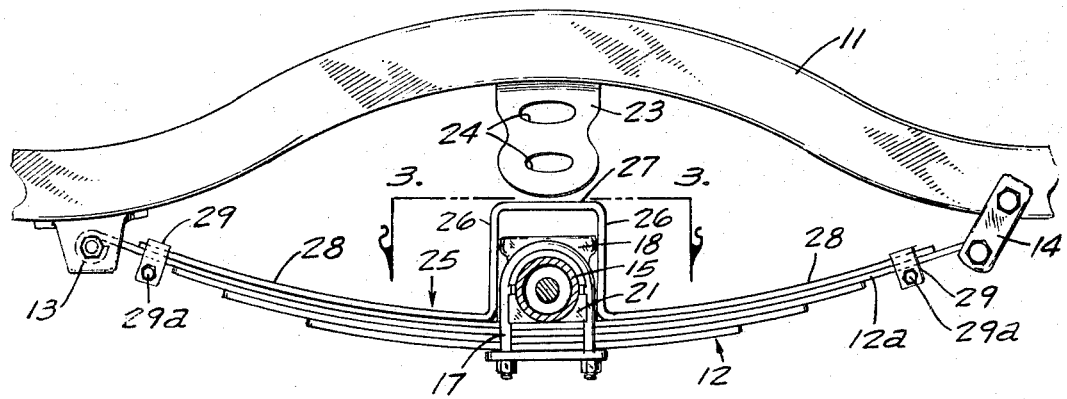
FIG. 2 is a fragmentary sectional view showing the spring and axle mount of FIG. 1 equipped with my invention.
Figure 3:
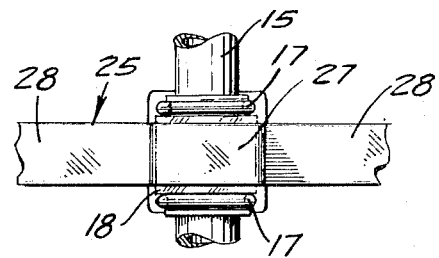
FIG. 3 is a fragmentary view of the mount taken on line 3—3 of FIG. 2 in the direction of the arrows.

Referring to FIGS. 2 and 3 wherein like numerals refer to the same parts as in FIG. 1, my novel overload spring 25 is shown, included with spring 12. Spring 25 has a bight with two parallel vertical portions 26 connected at the upper end by a flat horizontal portion 27. To the other end of each portion 26 are connected elliptical portions 28. The elliptical portions 28 together form a continuous elliptical curve. Of course, the portions 26, 27 and 28 are made from one continuous bar stock, which is substantially two and one-half inches wide, by one-quarter inch thick and of good spring steel. The distance between the two parallel portions 26 is made so that it is substantially the same as the width of bumper 18 and pad 21, to prevent the lower ends of the two portions 26 from closing together, as the spring flexes during the riding of the vehicle, as will be described more fully hereinafter. The outer ends of both elliptical portions 28 are fixed to the mian leaf 12a by suitable clamps 29, which are preferably U-shaped straps having a bolt 29a therethrough, as shown, with the U-shaped straps preferably welded to the ends of the elliptical portions 28. The length of the parallel portions 26 are chosen so that under normal overload conditions, i.e., when the pickup is converted into a camper, the flat portion 27 is disposed very close to the shock absorber 23. Thus, additional road clearance is provided without increasing the spring stiffness substantially.

My novel overload spring is easily installed by simply jacking up the vehicle by its frame, allowing the weight of the wheel and housing 15 to push down on the spring 12, causing the elliptical curve therein to assume a greater curvature. When the frame is jacked up a sufficient distance, my overload spring 25 is installed in a position as shown in FIG. 2. If the curvature of the main leaf 12a and my overload spring 25 do not correspond, I raise or lower the frame, putting less or more weight, respectively, on the wheel and housing than on the spring, until the curvatures correspond. Then I simply install the bolts 29a in the U-strap of the end clamps 29, the jack is removed and the vehicle is ready for the road. One can see that when a vehicle hits a bump, the vehicle rises, causing the leaves to flatten and the absorber 23 to make contact with portion 27 on my overload spring 25. When the wheels fall away from the chassis, the leaves will assume more curvature, including my overload spring 25. As the overload spring 25 flexes, the pad 21 prevents the parallel portions 26 from squeezing together, thereby obtaining full advantage of the spring action in the portions 28.

Although one embodiment of my invention is disclosed, the embodiment is to be considered as illustrative and not restrictive, the scope of my invention being indicated by the intended claims.

I claim:

1. In combination:
    a road vehicle having an axle, chassis and a multi-leaf semi-elliptical spring with a main leaf spring secured to said chassis by shackles, and secured to the axle, with the axle disposed between the spring and chassis;
    an overload spring having an elongated bar shaped with a bight formed at the mid-section, with a pair of portions on opposite sides thereof; said overload spring having the portions on opposite sides of said bight disposed adjacent the main leaf of said multi-leaf spring with the axle disposed within said bight; and
    means for securing in sliding relationship the ends of said overload spring to said main leaf to cause the overload spring to flex with the main leaf to aid in load carrying capacity thereof.

2. The combination of claim 1 wherein the opposite side portions of said bight on said overload springs are urged against said axle under substantially all load conditions.

3. The combination of claim 1 wherein said pair of portions on the elongated bar are elliptical with the bight disclosed on concave sides thereof.

4. The combination of claim 3, wherein said bight has two parallel portions connected by a straight portion, and said vehicle has a rubber shock absorber fixed to the underside of the chassis so that the absorber makes contact with said straight portion in overload conditions.

5. The combination of claim 4, wherein the curvature of said bar is chosen so that the parallel portion make contact with the axle under stubstantially all load conditions.

6. The combination of claim 5, wherein means are provided around said axle to maintain said straight portions apart.

7. The combination of claim 6, wherein said means for securing includes a U-shaped strap draped over said overload spring and said main leaf, and a bolt is connected thereacross.

* * * * *